United States Patent

Nowozin

(10) Patent No.: US 9,373,087 B2
(45) Date of Patent: Jun. 21, 2016

(54) DECISION TREE TRAINING IN MACHINE LEARNING

(71) Applicant: MICROSOFT TECHNOLOGY LICENSING, LLC, Redmond, WA (US)

(72) Inventor: Reinhard Sebastian Bernhard Nowozin, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 209 days.

(21) Appl. No.: 13/660,692

(22) Filed: Oct. 25, 2012

(65) Prior Publication Data

US 2014/0122381 A1   May 1, 2014

(51) Int. Cl.
*G06F 15/18*  (2006.01)
*G06N 99/00*  (2010.01)

(52) U.S. Cl.
CPC .................................... *G06N 99/005* (2013.01)

(58) Field of Classification Search
None
See application file for complete search history.

(56) References Cited

U.S. PATENT DOCUMENTS

| 5,930,392 | A * | 7/1999 | Ho .................................. 382/224 |
| 6,519,580 | B1 | 2/2003 | Johnson et al. |
| 6,748,341 | B2 * | 6/2004 | Crowder, Jr. ....... G05B 23/0254 702/181 |
| 6,944,862 | B2 | 9/2005 | Caggese et al. |
| 7,251,639 | B2 | 7/2007 | Bernhardt et al. |
| 7,716,154 | B2 | 5/2010 | Aggarwal et al. |
| 8,131,770 | B2 | 3/2012 | Grunschloβ et al. |
| 8,571,263 | B2 * | 10/2013 | Shotton ................... G06F 3/017 345/633 |
| 2003/0195831 | A1 * | 10/2003 | Feldman ................ G06Q 40/06 705/36 R |
| 2003/0236789 | A1 * | 12/2003 | Agrawal ........... G06F 17/30333 |
| 2005/0286772 | A1 * | 12/2005 | Albertelli ............. G06K 9/6292 382/224 |
| 2007/0185656 | A1 * | 8/2007 | Schadt ............... G01N 33/5023 702/19 |
| 2009/0083206 | A1 * | 3/2009 | Shigemori ........... G05B 19/418 706/46 |
| 2009/0226872 | A1 | 9/2009 | Gunther |
| 2010/0332430 | A1 | 12/2010 | Caraviello et al. |
| 2011/0119212 | A1 * | 5/2011 | De Bruin ................. A61B 5/00 706/12 |

(Continued)

OTHER PUBLICATIONS

Moskowitz et al.—Estimating the Empirical Lorenz Curve and Gini Coefficient in the Presence of Error—2007—http://biostats.bepress.com/mskccbiostat/paper12.*

(Continued)

*Primary Examiner* — Kakali Chaki
*Assistant Examiner* — Viker Lamardo
(74) *Attorney, Agent, or Firm* — Thomas Wong; Micky Minhas

(57) ABSTRACT

Improved decision tree training in machine learning is described, for example, for automated classification of body organs in medical images or for detection of body joint positions in depth images. In various embodiments, improved estimates of uncertainty are used when training random decision forests for machine learning tasks in order to give improved accuracy of predictions and fewer errors. In examples, bias corrected estimates of entropy or Gini index are used or non-parametric estimates of differential entropy. In examples, resulting trained random decision forests are better able to perform classification or regression tasks for a variety of applications without undue increase in computational load.

20 Claims, 11 Drawing Sheets

(56) References Cited

U.S. PATENT DOCUMENTS

| | | | |
|---|---|---|---|
| 2011/0188715 A1* | 8/2011 | Shotton | G06K 9/00 382/128 |
| 2011/0228997 A1* | 9/2011 | Sharp | G06T 19/00 382/131 |
| 2011/0258049 A1* | 10/2011 | Ramer | G06F 17/30867 705/14.66 |
| 2012/0166462 A1* | 6/2012 | Pathak | G06F 3/04842 707/758 |
| 2012/0239174 A1* | 9/2012 | Shotton | G06K 9/00362 700/93 |
| 2012/0269407 A1* | 10/2012 | Criminisi | G06T 7/0048 382/128 |
| 2012/0321174 A1* | 12/2012 | Tsymbal | G06K 9/6263 382/159 |
| 2013/0041623 A1* | 2/2013 | Kumar | G01C 21/14 702/158 |

OTHER PUBLICATIONS

Moskowitz et al.—Estimating the Empirical Lorenz Curve and Gini Coefficient in the Presence of Error.*

Peter Grassberger—Entropy Estimates from Insufficient Samplings.*

B. Efron—Bootstrap methods another look at the jackknife.*

Rainer W. Schiel—The Bootstrap and Jackknife Methods for Data Analysis.*

Sandri et al.—A bias correction algorithm for the Gini variable importance measure in classification trees.*

Lassner, Christoph, "An Analysis of Successful Approaches to Human Pose Estimation", In Universitat Augsburg Fakultat fur Angewandte Informatik Multimedia Computing and Computer Vision Lab, May 7, 2012, 115 pages.

"Decision tree learning", Retrieved on: Aug. 1, 2012, Available at: http://en.wikipedia.org/wiki/Decision_tree_learning.

Ahmed, et al., "Entropy Expressions and Their Estimators for Multivariate Distributions", In Proceedings of IEEE Transactions on Information Theory, vol. 35, Issue 3, May 1989, 5 pages.

Antos, et al., "Convergence Properties of Functional Estimates for Discrete Distributions", In Journal of Random Structures & Algorithms—Special Issue on Analysis of Algorithms Dedicated to Don Knuth on the Occasion of his (100) 8th Birthday, vol. 19, Issue 3-4, Sep. 26, 2001, 31 pages.

Beirlant, et al., "Nonparametric Entropy Estimation: An Overview", In International Journal of the Mathematical, Jul. 17, 2001, 14 pages.

Breiman, Leo, "Random Forests", In Journal of Machine Learning, vol. 45, Issue 1, Oct. 1, 2001, 33 pages.

Buja, et al., "Data Mining Criteria for Tree-Based Regression and Classification", In Proceedings of the Seventh ACM SIGKDD International Conference on Knowledge Discovery and Data Mining, Aug. 26, 2001, 18 pages.

Buja, et al., "Loss Functions for Binary Class Probability Estimation and Classification: Structure and Applications", In Technical Report, Department of Statistics, University of Pennsylvania, Nov. 3, 2005, 49 pages.

Buntine, et al., "A Further Comparison of Splitting Rules for Decision—Tree Induction", In Journal of Machine Learning, vol. 8, Issue 1, Jan. 1992, 11 pages.

Costa, et al., "Geodesic Entropic Graphs for Dimension and Entropy Estimation in Manifold Learning", In Proceedings of IEEE Transactions on Signal Processing, vol. 52, Issue 8, Aug. 2004, 12 pages.

Cover, et al., "Elements of Information Theory", Published on: Jun. 2006, Available at: http://www.dam.brown.edu/people/yiannis/PAPERS/antos.pdf.

Criminisi, et al., "Decision Forests for Classification, Regression, Density Estimation, Manifold Learning and Semi-Supervised Learning", In Technical Report MSR-TR-2011-114, Microsoft Research, Oct. 28, 2011, 151 pages.

Demsar, Janez, "Statistical Comparisons of Classifiers over Multiple Data Sets", In Journal of Machine Learning Research, vol. 7, Jan. 12, 2006, 30 pages.

Friedman, et al., "An Algorithm for Finding Best Matches in Logarithmic Expected Time", In Journal of ACM Transactions on Mathematical Software, vol. 3, Issue 3, Sep. 1977, 18 pages.

Grassberger, Peter, "Entropy Estimates from Insufficient Samplings", Published on: Jul. 29, 2003, Available on: http://arxiv.org/pdf/physics/0307138v1.pdf.

Hero, et al., "Asymptotic Theory of Greedy Approximations to Minimal K-point Random Graphs", In Proceedings of IEEE Transactions on Information Theory, vol. 45, Issue 6, Sep. 1999, 18 pages.

Hyafil, et al., "Constructing Optimal Binary Decision Trees is NP—Complete", In Information Processing Letters, vol. 5, Issue 1, May 1976, 3 pages.

Liu, et al., "The Importance of Attribute Selection Measures in Decision Tree Induction", In Journal of Machine Learning, vol. 15, Issue 1, Apr. 1994, 17 pages.

Mingers, John, "An Empirical Comparison of Selection Measures for Decision—Tree Induction", In Journal of Machine Learning, vol. 3, Issue 4, Mar. 1989, 24 pages.

Paninski, Liam, "Estimation of Entropy and Mutual Information", In Journal of Neural Computation, vol. 15, Issue 6, Jun. 2003, 63 pages.

Quinlan, J.R., "Induction of Decision Trees", In Journal of Machine Learning, vol. 1, Issue 1, Mar. 1986, 26 pages.

Schurmann, Thomas, "Bias Analysis in Entropy Estimation", In Journal of Physics A Mathematical and General, vol. 37, Jul. 19, 2004, 5 pages.

White, et al., "Bias in Information-Based Measures in Decision Tree Induction", In Journal of Machine Learning, vol. 15, Issue 3, Jun. 1994, 9 pages.

Wang, et al., "Universal estimation of information measures for analog soruces", In Foundation Trends Communication Information Theory vol. 5 pp. 265-353, Mar. 2009.

Harris, "The statistical estimation of entropy in the non-parametric case" Dec. 1975, NTIS.

Nowozin, "Improved information gain estimates for decision tree induction" Jun. 26, 2012, Proceedings of the 29th Int. Conference on Machine Learning.

Nemenman et al., "Entropy and inference, revisited" Feb. 2, 2008.

Grassberger, "Finite sample corrections to entropy and dimension estimates", Physics Letters A 128, 369 to 373 1988.

* cited by examiner

DECISION TREE TRAINING IN MACHINE LEARNING

BACKGROUND

Ensembles of decision trees, often called decision forests, are used in machine learning of classification and regression tasks such as for body joint position detection in natural user interface systems, for automated organ detection and recognition in medical imaging systems and for many other applications.

Existing approaches often use decision forests which are trained using labeled (or sometimes unlabeled) training data during a training phase. During training the structure of each tree in the decision forest is learnt (that is, how many nodes there are in the tree and how these are connected to one another) and also tests (also referred to as predicates) are selected for split nodes of each tree. In addition, data accumulates at the leaves of the trees in each forest during the training phase. A trained decision forest may be used during a test phase, where data previously unknown to the forest is passed through the forest to obtain an output. The output may be a predicted joint position in the case of a body joint position detection task or a probability of a particular body organ in the case of an organ detection and recognition system. Quality of the output may be related to how well the trained decision forest is able to generalize. That is how good the predictions are that it produces for data which is different from the data used during training. Training decision forests affects ability of the resulting trained forest to generalize. Training may be time consuming, complex, resource intensive and hard to achieve in application domains where little training data is available.

The embodiments described below are not limited to implementations which solve any or all of the disadvantages of known decision tree training systems for machine learning.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Improved decision tree training in machine learning is described, for example, for automated classification of body organs in medical images or for detection of body joint positions in depth images. In various embodiments, improved estimates of uncertainty are used when training random decision forests for machine learning tasks in order to give improved accuracy of predictions and fewer errors. In examples, bias corrected estimates of entropy or Gini index are used or non-parametric estimates of differential entropy. In examples, resulting trained random decision forests are better able to perform classification or regression tasks for a variety of applications without undue increase in computational load.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
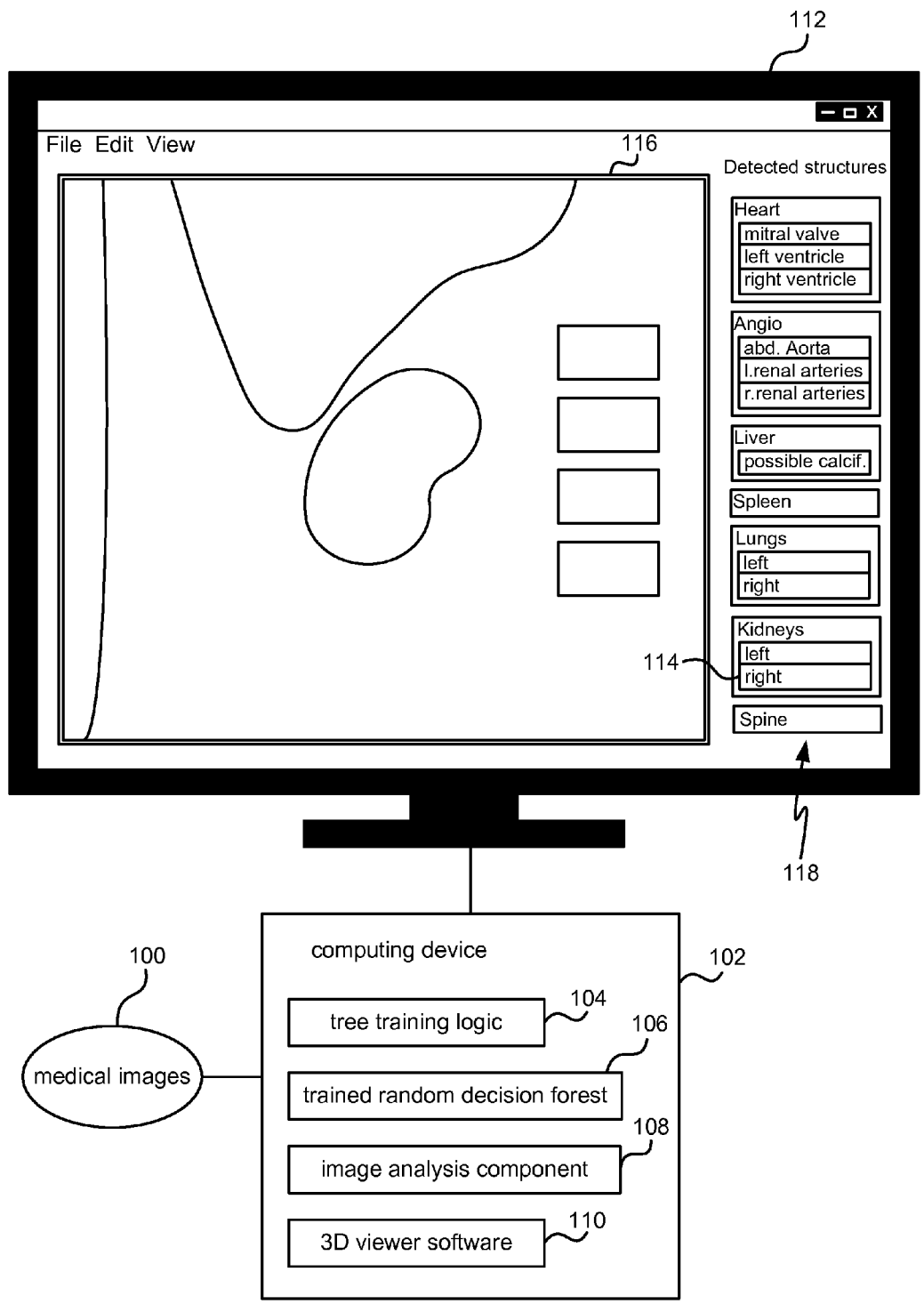
FIG. 1 is a schematic diagram of a tree training logic integral with a medical image analysis system for automated organ recognition.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a computer game system and a medical image analysis system, the examples are not intended as a limitation. As those skilled in the art will appreciate, the present examples are suitable for application in a variety of different types of machine learning systems in which random decision forests are used. These machine learning systems may be implemented in desktop computing systems, in slate computers, in laptop computers, in hand held computing devices, in computing devices which make use of remote resources in the cloud or at other locations, and in other types and form factors of computing device.

During training of a decision forest tests (also referred to as predicates) are selected for split nodes of each tree. The examples described herein use improved ways of selecting these tests so that the resulting trained decision forests have improved performance.

In some examples a measure of reduction in uncertainty is used to select tests during training. Improved uncertainty measures which take into account bias may be used and these are found to be especially useful where the machine learning task involves classification. For example, which of 12 possible body organs does an image element of medical image depict? For example a bias corrected Gini index or a bias corrected entropy measure may be used as improved uncertainty measures. The improved uncertainty measures which take into account bias are found to be especially useful for decision forests trained for classification tasks where there are many possible classes to choose from. For example, where the number of classes makes it hard to estimate empirical class frequencies reliably. In some application domains this may be where the number of possible classes is at least ten. In some other examples the random decision forest is trained for a regression task, such as predicting body joint positions from depth images. In this case an improved uncertainty measure which uses a non-parametric estimate may be used; for example, a non-parametric estimate of differential entropy may be used.

In examples where the machine learning task is a regression task, for example, predicting a joint position of a body depicted in a depth image, the uncertainty reduction measure typically uses a parametric approach. For example, a normal distribution may be used to approximate a distribution of training data. It is recognized herein that using a parametric approach introduces bias where the distribution of training data does not fit very well to the training data distribution. By using a non-parametric uncertainty measure improved performance is found for regression tasks without increasing computational resources and/or time unduly.

Examples of the improved uncertainty measures and how they are used to train a random decision forest are now given in the context of two examples. A first example, involving a classification task, is discussed with reference to FIGS. 1 to 5. The example comprises a medical image analysis system which recognizes body organs and determines positions of those organs. The medical image analysis system uses a random decision forest trained to classify image elements of a medical image into body organ classes.

A second example, discussed with reference to FIGS. 6 to 10 comprises a camera-based control system for controlling a computer game. The system has a random decision forest trained on a regression task to predict body joint positions of a player of the game.

FIG. 1 is a schematic diagram of a tree training logic 104 integral with a medical image analysis system 102 for automated organ recognition. The medical image analysis system 102 takes medical images 100 as input. The medical images may be for example, magnetic resonance images (MRI), computed tomography (CT) images, single photon emission computed tomography (SPECT) images, positron emission tomography (PET) images and ultrasound scans. The medical images may be two-dimensional images, three-dimensional volumetric images or higher dimensional images (such as where each image element has additional sensed data associated with it).

The medical image analysis system 102 may comprise a computing device having the tree training logic 104, a trained random decision forest 106, an image analysis component 108 and 3D viewer software 110. The computing device may comprise other components as described later in this document with reference to FIG. 11 and not illustrated in FIG. 1 for clarity. The tree training logic 104 is arranged to use one or more of the improved uncertainty measures described herein when producing the trained random decision forest 106. The image analysis component 108 is arranged to use the trained random decision forest 106 to classify image elements of a medical image into organ classes and optionally to estimate the center of the organs. The 3D viewer software 110 uses the output from the image analysis component 108 and the trained random decision forest 106 to display results at a display device 112.

FIG. 1 shows a display device 112 (such as a computer monitor) on which is shown a user interface comprising a plurality of controls 118 and a display window 116. The 3D viewer software 110 may use the results of the automatic classification (from the trained random decision forest 106) and organ centers to control the display of a medical image shown in the display window 116. For example, the plurality of controls 118 can comprise buttons for each of the organs detected, such that when one of the buttons is selected the image shown in the display window 116 is automatically centered on the estimated organ center.

For example, FIG. 1 shows a 'right kidney' button 114, and when this is selected the image in the display window is centered on the right kidney. This enables a user to rapidly view the images of the kidney without spending the time to browse through the image to find the organ.

The viewer program can also use the image element classifications to further enhance the image displayed in the display window 116. For example, the viewer can color each image element in dependence on the organ classification. For example, image elements classed as kidney can be colored blue, liver colored yellow, blood vessels colored red, background grey, etc. Furthermore, the class probabilities associated with each image element can be used, such that a property of the color (such as the opacity) can be set in dependence on the probability. For example, an image element classed as a kidney with a high probability can have a high opacity, whereas an image element classed as a kidney with a low probability can have a low opacity. This enables the user to readily view the likelihood of a portion of the image belonging to a certain organ.

Figure 2:
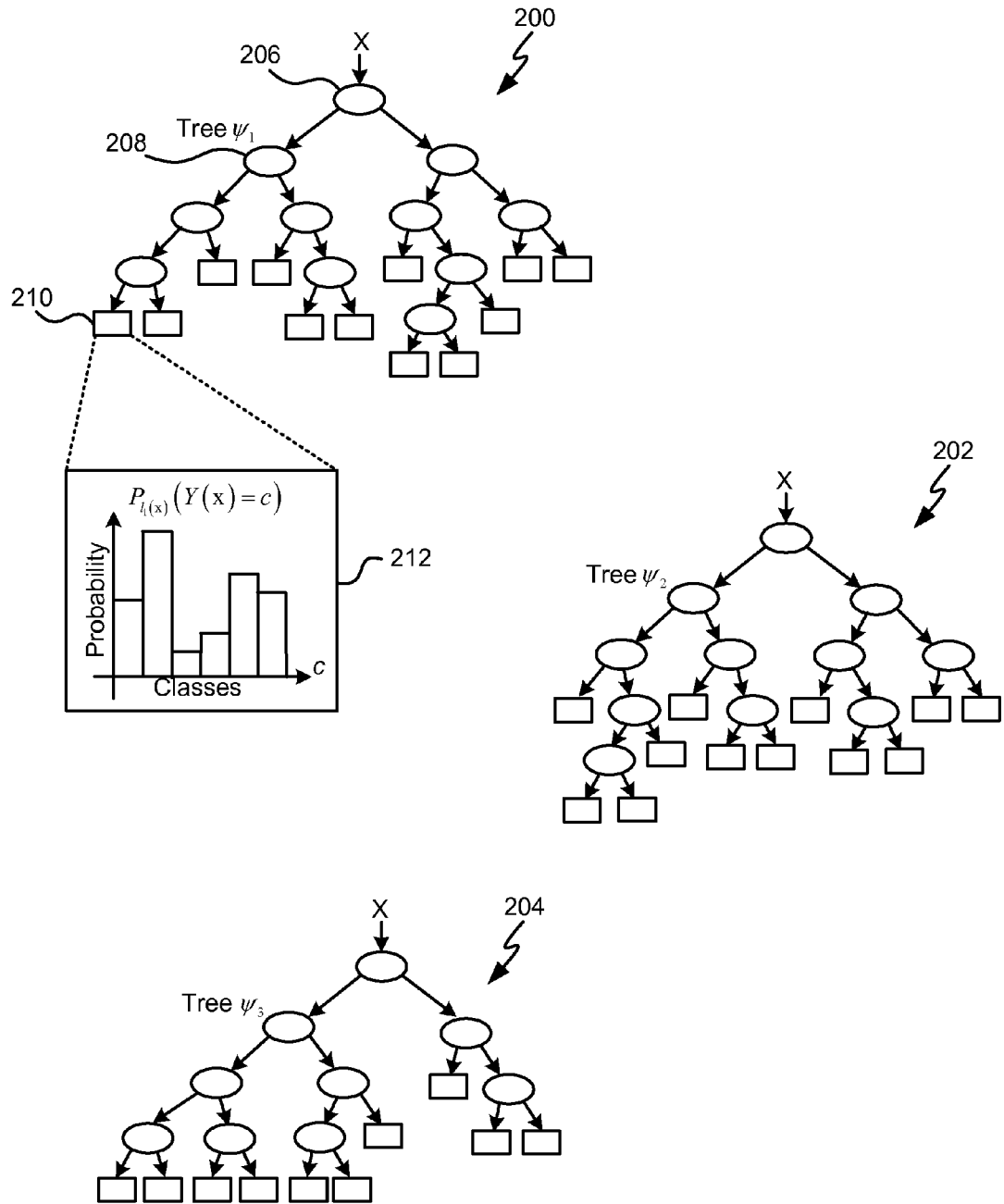
FIG. 2 is a schematic diagram of a random decision forest.

FIG. 2 is a schematic diagram of a random decision forest comprising three random decision trees: a first tree 200; a second tree 202; and a third tree 204. It is not essential to have exactly three decision trees; a random decision forest may have two or more random decision trees. Each decision tree comprises a root node (e.g. root node 206 of the first decision tree 200), a plurality of internal nodes, called split nodes (e.g. split node 208 of the first decision tree 200), and a plurality of leaf nodes (e.g. leaf node 210 of the first decision tree 200).

In operation, each root and split node of each tree performs a test on the input data and based on the result directs the data to one of a plurality of child nodes. In some examples the test is a binary test and there are two child nodes. However, it is also possible to have more than two child nodes and to use a test which partitions the data into two or more classes. For example, where categorical attributes such as age are used and data is binned into a plurality of age ranges. The leaf nodes do not perform any action; they store probability distributions (e.g. example probability distribution 212 for a leaf node of the first decision tree 200 of FIG. 2).

Figure 3:
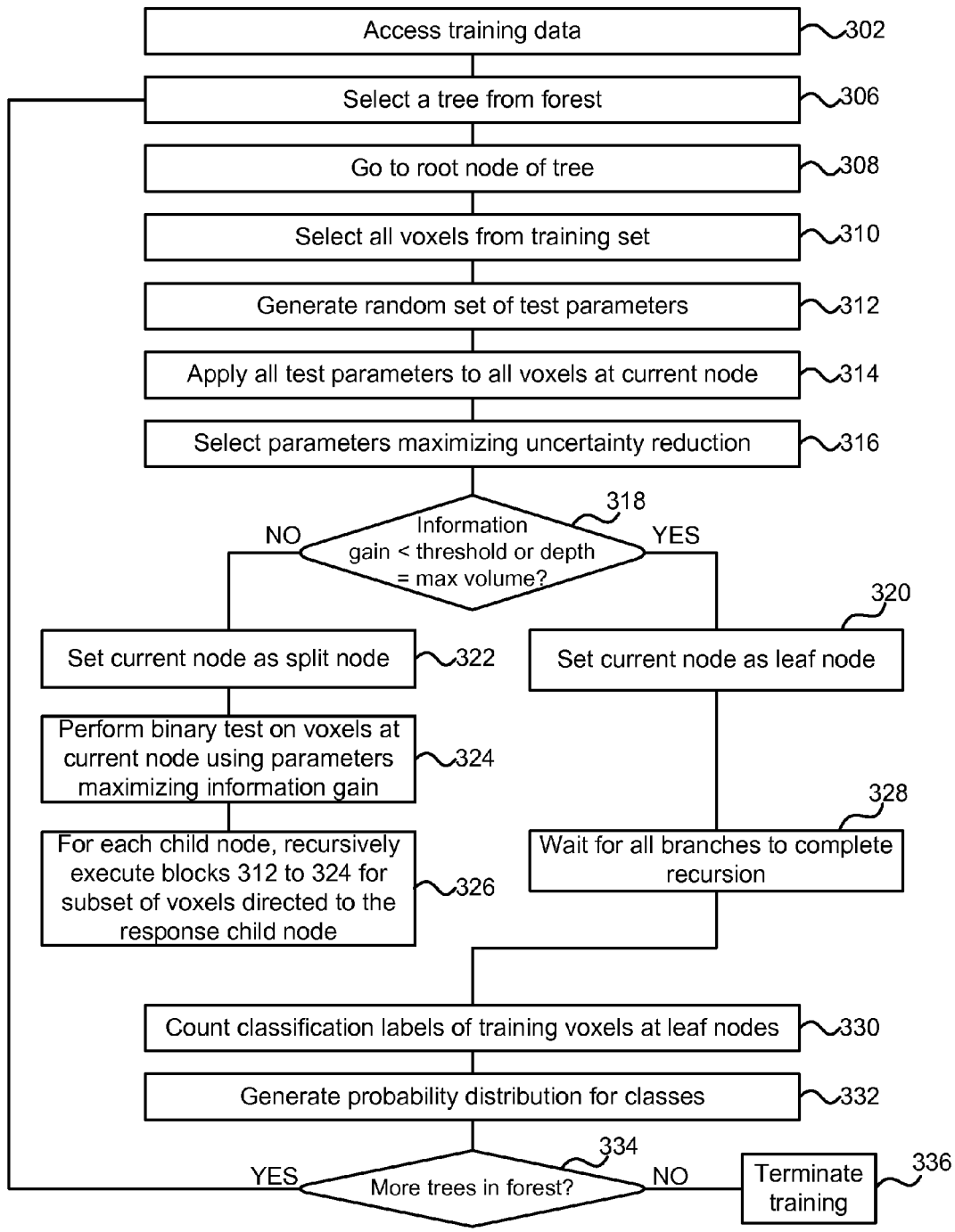
FIG. 3 is a flow diagram of a method of training a random decision tree.

FIG. 3 is a flow diagram of a method of training a random decision tree. For example, this method, or part of this method may be implemented at the tree training logic 104 of FIG. 1. Firstly, a labeled ground-truth collection of training images is accessed 302. The training images may be labeled by radiologists or other experts in a manual or semi-manual process or may be labeled automatically. The labels indicate into which of a plurality of known body organ classes an image element is classified.

The manner in which parameters used by each of the split nodes are chosen, how the structure of each tree is formed, and how the leaf node probabilities are computed is now described with reference to FIG. 3. A decision tree from the decision forest is selected 306 (e.g. the first decision tree 200) and the root node 206 is selected 308. All image elements from each of the training images are then selected 310. Each image element x of each training image is associated with a known class label. The class label indicates whether an image element x belongs to the class of head, heart, left eye, right eye, left kidney, right kidney, left lung, right lung, liver, blood vessel, or background, where the background class label indicates that the point x is not an organ centre.

A random set of test parameters are then generated 312 for use by the test (binary test or a test where data is partitioned into more than two classes) performed at the root node. The result of the binary test performed at a root node or split node determines which child node an image element is passed to. For example, if the result of the binary test is true, the image element is passed to a first child node, whereas if the result is false, the image element is passed to a second child node.

The random set of test parameters generated comprise a plurality of random values for a function parameter. In order to inject randomness into the decision trees, the function parameters of each split node may be optimized only over a randomly sampled subset of all possible parameter values. This is an effective and simple way of injecting randomness into the trees, and increases generalization.

Every combination of test parameter is applied 314 to each image element in the training images. For each combination, the reduction in uncertainty that the split produces in the training data (for example, the information gain score, or a bias corrected Gini score) is calculated. The combination of parameters that maximize the reduction in uncertainty is selected 316 and stored at the current node for future use. Improved measures of the information gain, improved Gini score measures or other improved uncertainty measures are used as described in more detail below.

It is then determined 318 whether the value for the optimal uncertainty reduction is less than a threshold. If the value for the uncertainty reduction is less than the threshold, then this indicates that further expansion of the tree does not provide significant benefit. This gives rise to asymmetrical trees which naturally stop growing when no further nodes are needed. In such cases, the current node is set 320 as a leaf node. Similarly, the current depth of the tree is determined 318 (i.e. how many levels of nodes are between the root node and the current node). If this is greater than a predefined maximum value, then the current node is set 320 as a leaf node. In one example, the maximum tree depth can be set to 15 levels, although other values can also be used.

If the value for the maximized uncertainty reduction is greater than or equal to the threshold, and the tree depth is less than the maximum value, then the current node is set 322 as a split node. As the current node is a split node, it has child nodes, and the process then moves to training these child nodes. Each child node is trained using a subset of the training image elements at the current node. The subset of image elements sent to a child node is determined using the parameters that maximized the uncertainty reduction. These parameters are used in the binary test, and the binary test performed 324 on all image elements at the current node. The image elements that pass the binary test form a first subset sent to a first child node, and the image elements that fail the binary test form a second subset sent to a second child node.

For each of the child nodes, the process as outlined in blocks 312 to 324 of FIG. 3 are recursively executed 326 for the subset of image elements directed to the respective child node. In other words, for each child node, new random test parameters are generated 312, applied 314 to the respective subset of image elements, parameters maximizing the uncertainty reduction are selected 316, and the type of node (split or leaf) determined 318. If it is a leaf node, then the current branch of recursion ceases. If it is a split node, binary tests are performed 324 to determine further subsets of image elements and another branch of recursion starts. Therefore, this process recursively moves through the tree, training each node until leaf nodes are reached at each branch. As leaf nodes are reached, the process waits 328 until the nodes in all branches have been trained. Note that, in other examples, the same functionality can be attained using alternative techniques to recursion.

Once all the nodes in the tree have been trained to determine the parameters for the binary test maximizing the uncertainty reduction at each split node, and leaf nodes have been selected to terminate each branch, then probability distributions can be determined for all the leaf nodes of the tree. This may be achieved by counting 330 the class labels of the training image elements that reach each of the leaf nodes. All the image elements from all of the training images end up at a leaf node of the tree. As each image element of the training images has a class label associated with it, a total number of image elements in each class can be counted at each leaf node. From the number of image elements in each class at a leaf node and the total number of image elements at that leaf node, a probability distribution for the classes at that leaf node can be generated 332. To generate the distribution, the histogram is normalized. Optionally, a small prior count can be added to all classes so that no class is assigned zero probability, which can improve generalization.

An example probability distribution 212 is shown illustrated in FIG. 2 for leaf node 210. The probability distribution shows the classes of image element c against the probability of an image element belonging to that class at that leaf node. In other words, the leaf nodes store the posterior probabilities over the classes being trained. Such a probability distribution can therefore be used to determine the likelihood of an image element reaching that leaf node belonging to a given class of organ, as described in more detail hereinafter.

Returning to FIG. 3, once the probability distributions have been determined for the leaf nodes of the tree, then it is determined 334 whether more trees are present in the decision forest. If so, then the next tree in the decision forest is selected, and the process repeats. If all the trees in the forest have been trained, and no others remain, then the training process is complete and the process terminates 336.

Therefore, as a result of the training process, a plurality of decision trees are trained using training images. Each tree comprises a plurality of split nodes storing optimized test parameters, and leaf nodes storing associated probability distributions. Due to the random generation of parameters from a limited subset used at each node, the trees of the forest are distinct (i.e. different) from each other. Alternatively, when training each individual tree, a different version of the data set is used by means of a resampling procedure such as bootstrap resampling. Because each individual tree is given a different version of the data set, the trees of the forest are distinct from each other.

More detail about the process at box 316 of FIG. 3 is now given. This process involves selecting the test parameter values which maximize a quality of the split made by the test parameter values on the training data. The term "split" refers to a division of the training data between a left and a right child node of the node for which the test parameter values are being selected. The uncertainty is a criterion which may be used to determine the quality of a split for many applications.

An example of an uncertainty criterion is information gain (which involves estimating entropy). Another example of an uncertainty criterion is a Gini score or index which is a measure of inequality of a multinomial distribution.

An information gain may be defined as the mutual information between the local node decision (left or right) and the predictive output. This can be thought of as the difference between the entropy of the training data before it enters the node, and the sum of the entropy of the training data at each of the child nodes after the split, weighted according to the proportions of data assigned to the left and right child nodes. In the case of classification tasks, the entropies are discrete entropies. In the case of regression tasks or density estimation tasks, the entropies are differential entropies.

It is recognized herein that estimating the information gain is typically achieved by estimating the entropies (discrete or differential) using a finite sample of data (i.e. the training data). This may lead to results which are inaccurate and/or biased especially where limited amounts and variety of training data is available.

For example, it is recognized herein that many existing processes for estimating information gain (and other uncertainty measures) use so called "plug in" estimators where a function is evaluated on an estimated probability distribution. For example, the probability distribution may be estimated from the training data. This leads to bias and/or inaccuracy as mentioned above because many plug in estimates of entropy (which may be used as part of an information gain measure) are found to universally underestimate the true entropy or to use a parametric distribution which is not able to optimally fit the training data.

It is also recognized herein that many existing processes for estimating the Gini index suffer from bias where the training data is finite. Many existing processes for estimating the Gini index use plug in estimators which introduce bias as described above.

Figure 4:
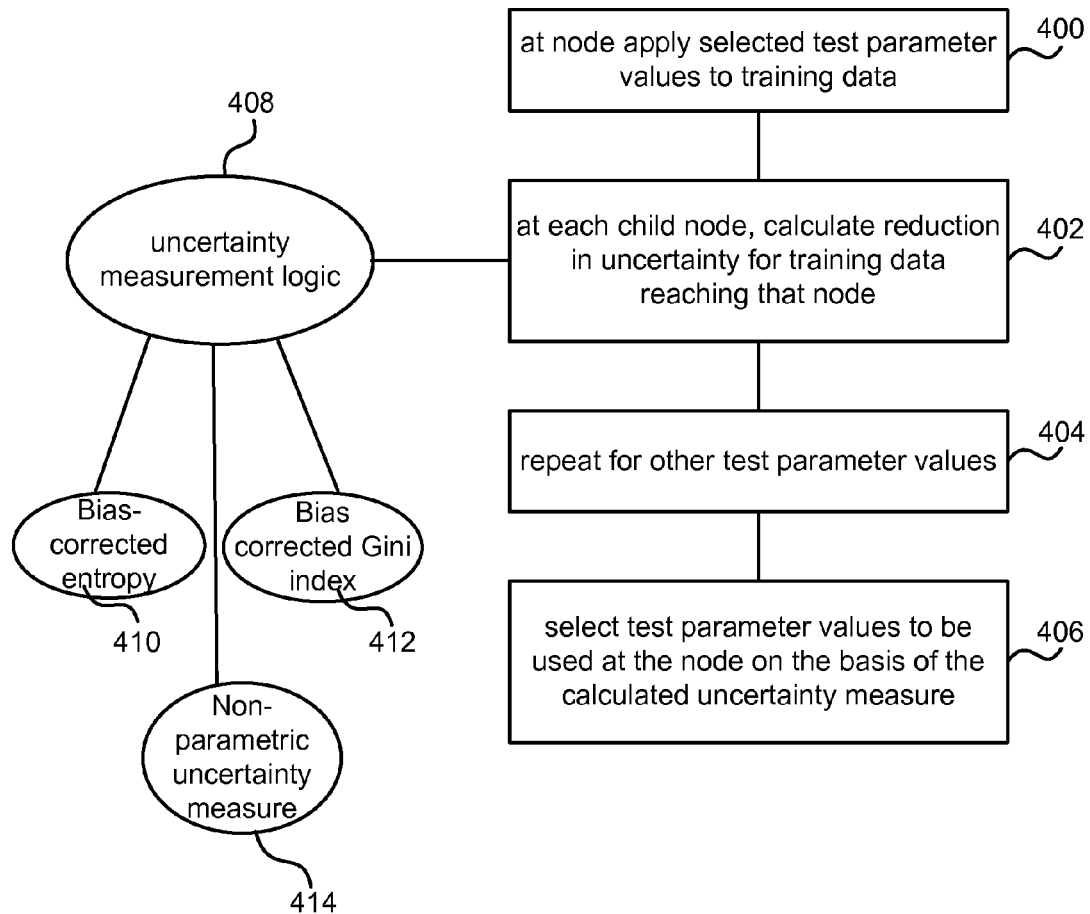
FIG. 4 is a flow diagram of part of the method of FIG. 3 in more detail.
Figure 5:
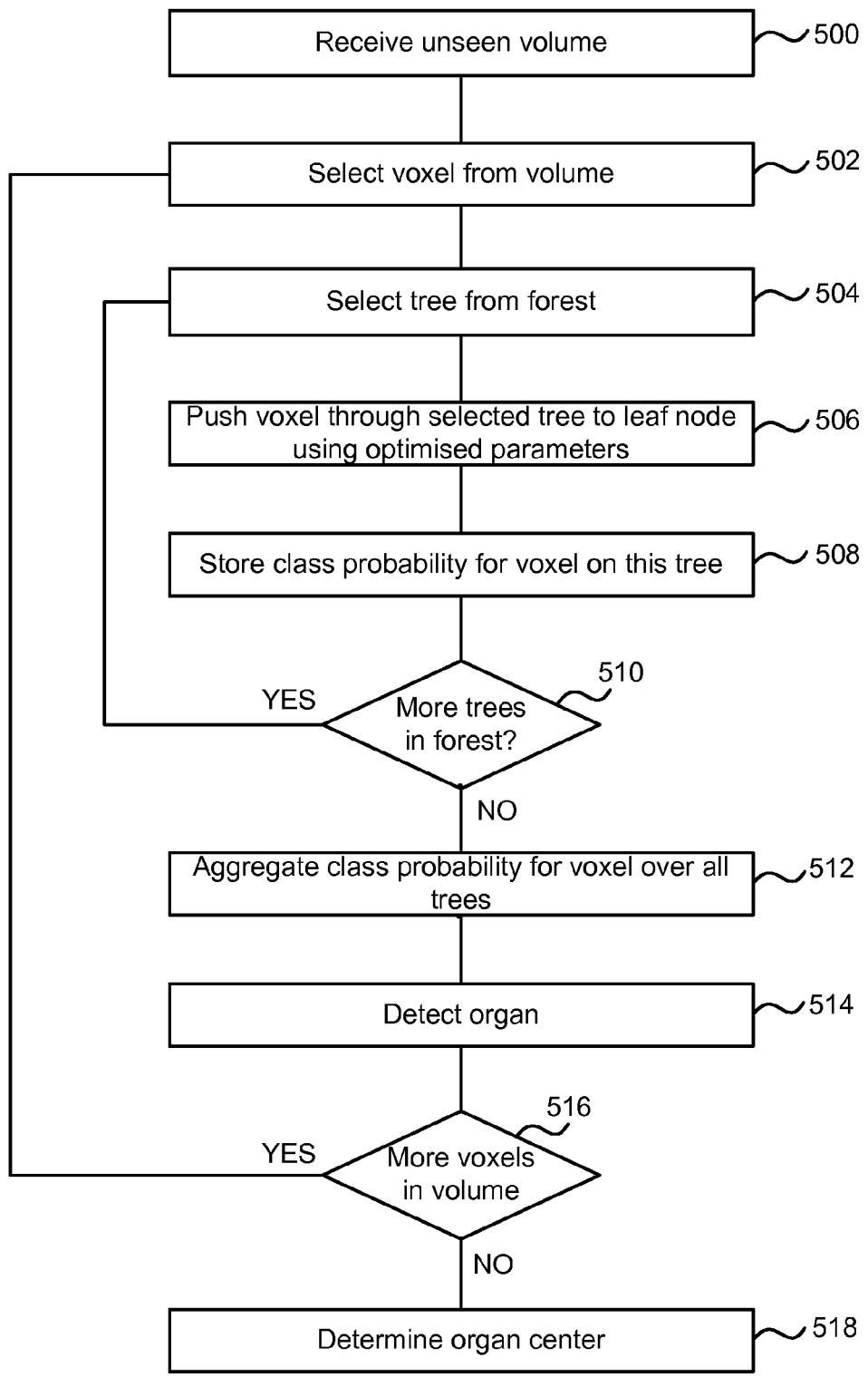
FIG. 5 is a flow diagram of a method of using a trained random decision forest for organ detection and location in medical images.

As shown in FIG. 4 a bias corrected or non-parametric uncertainty measurement logic 408 is provided. The logic 408 may have one or more of: a bias-corrected gini index component 412, a bias-corrected entropy component 410 and a non-parametric component 414. The logic 408 is a computer-implemented process which calculates a measure of uncertainty which is bias corrected in the case of classification tasks and/or which uses a non-parametric process in the case of regression or density estimation tasks. This logic 408 may be implemented using software on a computing device or may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

As shown in FIG. 4 a tree training process (such as that of FIG. 3), at a given node in the tree, applies 400 selected test parameter values to training data which reaches that node. The tree training process calculates 402 a reduction in uncertainty using the uncertainty measurement logic 408. This is repeated 404 for other test parameter values (which may be randomly selected from a range). Test parameter values are then selected 406 to be used at the node (during a test phase) on the basis of the calculated uncertainty measure.

More detail about the bias-corrected Gini index component 412 is now given. As mentioned above a Gini score or index is a measure of inequality of a multinomial distribution and it may be defined as:

$$g(p) = 1 - \Sigma_{k=1}^{K} p_k^2$$

Which may be expressed in words as a Gini index of a probability distribution p is 1 minus the sum over all the bins of the probability distribution (where the probability distribution is a histogram of k bins) of the probability of that bin squared. Plug-in estimate of the Gini index may be used where there is a finite amount of training data (samples of the underlying multinomial distribution). The plug-in estimate may be expressed as:

$$\hat{g}(\hat{p}) = 1 - \Sigma_{k=1}^{K} \hat{p}_k^2$$

Which may be expressed in words as an estimate of a Gini index of an estimated probability distribution p hat is 1 minus the sum over all the bins of the probability distribution (where the probability distribution is a histogram of k bins) of the estimated probability of that bin squared. This plug-in estimate suffers from bias, especially where the number of items of training data is limited.

A bootstrap resampling method may be used to take into account the bias and produce an improved estimate of the Gini index. This bootstrap resampling method estimates a mean of a probability distribution of an estimated Gini index of a sample (of size n) from the training data. This estimated mean may be related to the bias of the estimate Gini index. The estimated Gini index may then be bias corrected by subtracting the estimated mean from the estimated Gini index. This may be expressed as:

$$\hat{g}(\hat{p}) = 1 - \sum_{k=1}^{K} \left( \hat{p}_k^2 - \frac{\hat{p}_k - \hat{p}_k^2}{n} \right)$$

Which may be expressed in words as an estimate of a Gini index of an estimated probability distribution p hat is 1 minus the sum over all the bins of the probability distribution (where the probability distribution is a histogram of k bins) of the estimated probability of that bin squared minus the difference between the estimate of the probability of bin k minus the estimate of the probability of bin k squared divided by the number of samples.

A jackknife subsampling method may be used to take into account the bias and produce an improved estimate of the Gini index and with reduced computational complexity. This subsampling method may comprise aggregating K (the number of bins in the histogram of the multinomial distribution representing the training data) estimates of the Gini index which are Tukey holdout estimates of the Gini index. A Tukey holdout estimate of a Gini index is a perturbation of a plugin estimate of a Gini index. This approach may be thought of as aggregating a plurality of perturbations of a biased estimate of a Gini index. The plurality of perturbations may be expressed as:

$$\hat{g}^k(H_n) = \frac{n^2}{(n-1)^2}(\hat{g}(H_n) - 1) + \left(\frac{h_k}{n-1}\right)^2 - \left(\frac{h_k - 1}{n-1}\right)^2 + 1$$

The aggregated estimate of these values may be given as follows by treating all samples assigned to the same bin as identical:

$$\widetilde{g_{jk}}(H_n) = n\hat{g}(H_n) - \frac{(n-1)}{n}\sum_{k=1}^{k} h_k \hat{g}^{(k)}(H_n)$$

Which may be expressed in words as the bias—corrected estimate of the Gini index (represented using symbol g hat subscript jk), for n samples equals n time the original plug-in estimate minus a sum of Tukey hold out estimates, each multiplied by the number of observed counts for the respective bin and the entire sum of these terms multiplied by the number of samples minus 1 divided by the number of samples.

More detail about the bias corrected entropy component 410 is now given. For example, this component may use a Grassberger entropy estimate as part of a process to estimate the information gain. A Grassberger entropy estimate is only one example of a bias corrected entropy measure; other bias corrected entropy measures may be used.

An example Grassberger entropy estimate may be given as:

$$\hat{H}_G(h) = \log n - \frac{1}{n}\sum_{k=1}^{K} h_k G(h_k)$$

Which may be expressed in words as, an estimate of a Grassberger entropy of a samples h of training data equals the logarithm of the number of samples of training data n minus 1 divided by the number of samples of training data times the sum over histogram bins (the number of bins K in a histogram of the probability distribution representing the training data) of the number of samples in bin k times a function G applied to the number of samples in bin k. The function G may be given as:

$$G(h_k) = \psi(h_k) + \frac{1}{2}(-1)^{h_k}\left(\psi\left(\frac{h^k+1}{2}\right) - \psi\left(\frac{h^k}{2}\right)\right)$$

Which may be expressed in words as a function G applied to the number of samples in bin k is equal to the digamma function of the number of samples in bin k plus one half of minus 1 to the power of the number of samples in bin k times the digamma function of the number of samples in bin k plus 1 divided by two, minus the digamma function of the number of samples in bin k divided by two. For small sample sized the function differs from the logarithm of the number of samples in bin k and the resulting estimate of the entropy is more accurate.

More detail about the non-parametric uncertainty measure component 414 is now given. Instead of making the assumption that the distribution (from which the training data comes) belongs to a parametric family of distributions, non-parametric estimates of uncertainty aim to work for all distributions satisfying some general assumptions. For example, bounded support and absolute continuity. Many different types of non-parametric uncertainty measures may be used. It has been found empirically that a one-nearest neighbor estimator of the differential entropy provides good results for training random decision forests on multi-variate regression tasks. A one-nearest neighbor estimator of differential entropy is a process which takes into account nearest neighbor distances between training data samples in the training data used to train the random decision forest. The training data samples exist in a multi-dimensional space and, for each training data item, a distance to another training data sample which is closest to it in the multi-dimensional space is the nearest-neighbor distance. The nearest neighbor distances may be aggregated to give an estimate of the differential entropy as follows:

$$\hat{H}_{1NN} = \frac{d}{n}\sum_{i=1}^{n} \log_{p_i} + \log(n-1) + \gamma + \log V_d$$

Which may be expressed in words as an estimate of the differential entropy (using a one nearest neighbor method) is equal to the number of dimensions d of the multi-dimensional space in which the training data exists divided by the number of training data samples times the sum over the training data of the logarithm of the Euclidean distance of the ith training data instance to its 1-nearest neighbor plus the logarithm of the number of training data samples minus 1, plus a constant γ (the Euler-Mascheroni constant) and plus another constant log $V_d$ (the volume of the d-dimensional hypersphere).

Other non-parametric estimates of the differential entropy may be used such as those using kernel density estimates, those using length of minimum spanning trees and those using k-nearest neighbor distances.

It is found that, where the number of dimensions of the multi-dimensional space is about ten or less than a nearest neighbor estimate of differential entropy may be efficiently computed using k-d trees.

Figure 6:
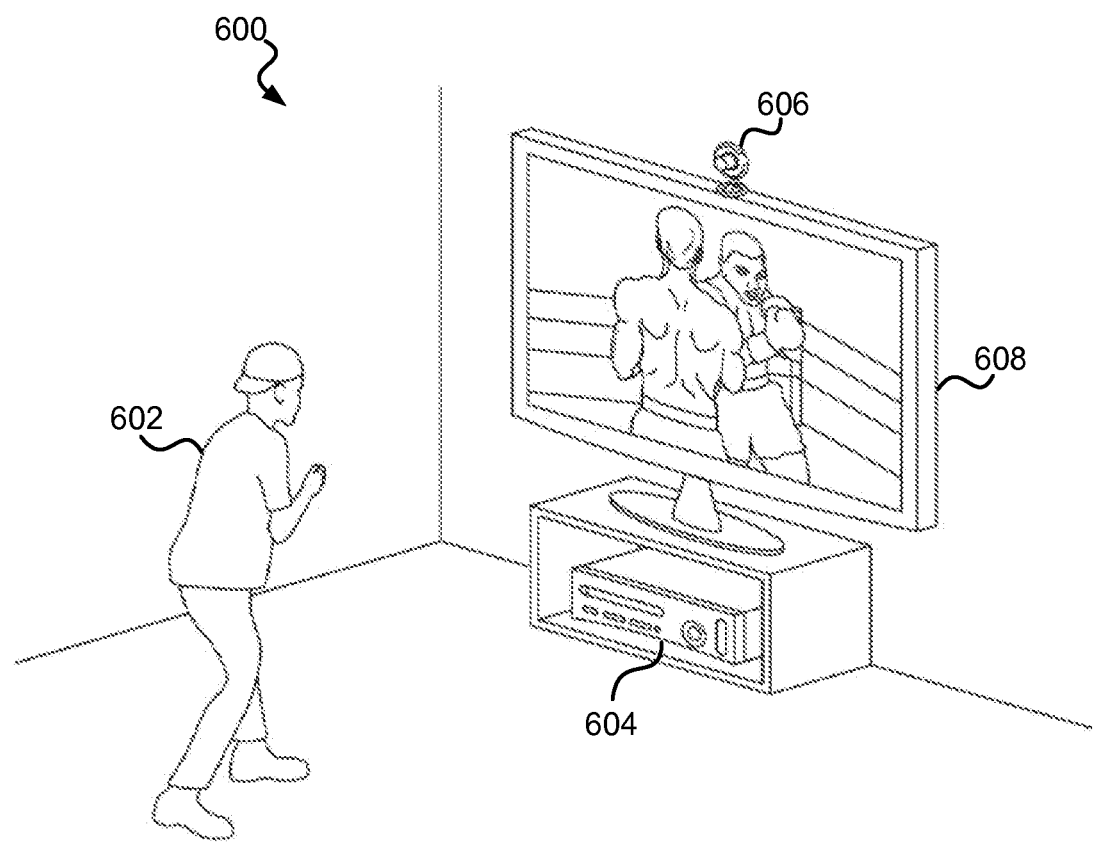
FIG. 6 is a schematic diagram of a person playing a game using a natural user interface implemented using a camera-based control system.

FIG. 6 shows an example camera-based control system 600 for controlling a computer game. FIG. 6 shows a user 602 playing, in this illustrative example, a boxing game. In some examples, camera-based control system 600 can be used to, among other things, determine body pose, bind, recognize, analyze, track, associate to a human target, provide feedback, interpret gestures, and/or adapt to aspects of a human target such as the user 602.

The camera-based control system 600 comprises a computing device 604. The computing device 604 can be a general purpose computer, gaming system or console, or dedicated image processing device. The computing device 604 can include hardware components and/or software components such that the computing device 604 can be used to execute applications such as gaming applications and/or non-gaming applications. The structure of the computing device 604 is discussed hereinafter with reference to FIG. 11.

The camera-based control system 600 further comprises a capture device 606. The capture device 606 can be, for example, an image sensor or detector that can be used to visually monitor one or more users (such user 602) such that gestures performed by the one or more users can be captured, analyzed, processed, and tracked to perform one or more controls or actions within a game or application, as described in more detail below.

The camera-based control system 600 can further comprise a display device 608 connected to the computing device 604. The computing device can be a television, a monitor, a high-definition television (HDTV), or the like that can provide game or application visuals (and optionally audio) to the user 602.

In operation, the user 602 can be tracked using the capture device 606 such that the joint positions, movements and size of user 602 can be interpreted by the computing device 604 (and/or the capture device 606) as controls that can be used to affect the application being executed by computing device 604. As a result, the user 602 can move his or her body to control an executed game or application.

In the illustrative example of FIG. 6, the application executing on the computing device 604 is a boxing game that the user 602 is playing. In this example, the computing device 604 controls the display device 608 to provide a visual representation of a boxing opponent to the user 602. The computing device 604 also controls the display device 608 to provide a visual representation of a user avatar that the user 602 can control with his or her movements. For example, the user 602 can throw a punch in physical space to cause the user avatar to throw a punch in game space. Thus, according to this example, the computing device 604 and the capture device 606 of the camera-based control system 600 can be used to recognize and analyze the punch of the user 602 in physical space such that the punch may be interpreted as a game control of the user avatar in game space.

Furthermore, some movements can be interpreted as controls that correspond to actions other than controlling the avatar. For example, the user can use movements to enter, exit, turn system on or off, pause, save a game, select a level, profile or menu, view high scores, communicate with a friend, etc. Additionally, movement of the user 602 can be used and analyzed in any suitable manner to interact with applications other than games, for example to enter text, select icons or menu items, control media playback, browse websites or operate any other controllable aspect of an operating system or application.

Figure 7:
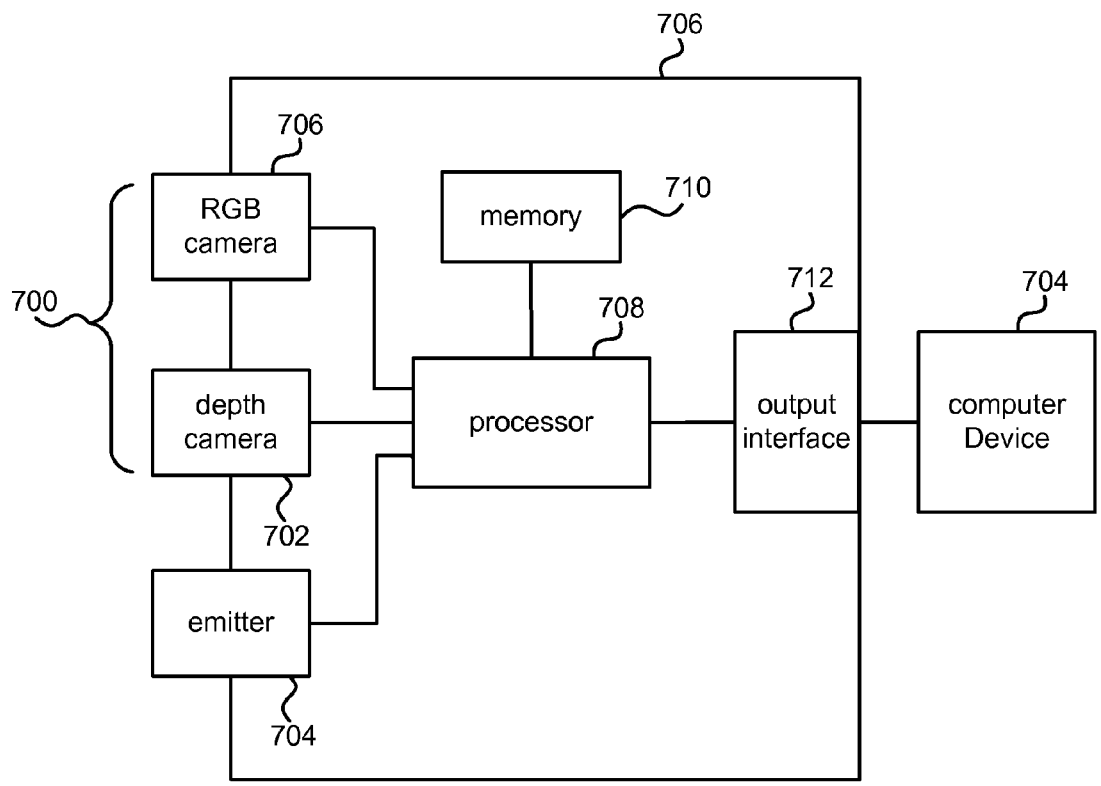
FIG. 7 is a schematic diagram of an image capture device for use with the camera-based control system of FIG. 6.

Reference is now made to FIG. 7, which illustrates a schematic diagram of the capture device 706 that can be used in the camera-based control system 600 of FIG. 6. In the example of FIG. 7 the capture device 706 is configured to capture video images with depth information. Such a capture device can be referred to as a depth camera. The depth information can be in the form of a depth image that includes depth values, i.e. a value associated with each image element of the depth image that is related to the distance between the depth camera and an item or object located at that image element.

The depth information can be obtained using any suitable technique including, for example, time-of-flight, structured light, stereo image, or the like. In some examples, the capture device 706 can organize the depth information into "Z layers," or layers that may be perpendicular to a Z-axis extending from the depth camera along its line of sight.

As shown in FIG. 7, the capture device 706 comprises at least one imaging sensor 700. In the example shown in FIG. 7, the imaging sensor 700 comprises a depth camera 702 arranged to capture a depth image of a scene. The captured depth image can include a two-dimensional (2-D) area of the captured scene where each image element in the 2-D area represents a depth value such as a length or distance of an object in the captured scene from the depth camera 702.

The capture device can also include an emitter 704 arranged to illuminate the scene in such a manner that depth information can be ascertained by the depth camera 702. For example, in the case that the depth camera 702 is an infra-red (IR) time-of-flight camera, the emitter 704 emits IR light onto the scene, and the depth camera 702 is arranged to detect backscattered light from the surface of one or more targets and objects in the scene. In some examples, pulsed infrared light can be emitted from the emitter 704 such that the time between an outgoing light pulse and a corresponding incoming light pulse can be detected by the depth camera and measured and used to determine a physical distance from the capture device 706 to a position on the targets or objects in the scene. Additionally, in some examples, the phase of the outgoing light wave from the emitter 704 can be compared to the phase of the incoming light wave at the depth camera 702 to determine a phase shift. The phase shift can then be used to determine a physical distance from the capture device 706 to a position on the targets or objects. In a further example, time-of-flight analysis can be used to indirectly determine a physical distance from the capture device 706 to a position on the targets or objects by analyzing the intensity of the reflected beam of light over time via various techniques including, for example, shuttered light pulse imaging.

In another example, the capture device 706 can use structured light to capture depth information. In such a technique, patterned light (e.g., light displayed as a known pattern such as grid pattern or a stripe pattern) can be projected onto the scene using the emitter 704. Upon striking the surface of one or more targets or objects in the scene, the pattern becomes deformed. Such a deformation of the pattern can be captured by the depth camera 702 and then be analyzed to determine a physical distance from the capture device 706 to a position on the targets or objects in the scene.

In another example, the depth camera 702 can be in the form of two or more physically separated cameras that view a scene from different angles, such that visual stereo data is obtained that can be resolved to generate depth information. In this case the emitter 704 can be used to illuminate the scene or can be omitted.

In some examples, in addition to the depth camera 702, the capture device 706 can comprise a regular video camera, which is referred to as an RGB camera 706. The RGB camera 706 is arranged to capture sequences of images of the scene at visible light frequencies, and can hence provide images that can be used to augment the depth images. In alternative examples, the RGB camera 706 can be used instead of the depth camera 702.

The capture device 706 shown in FIG. 7 further comprises at least one processor 708, which is in communication with the imaging sensor 700 (i.e. depth camera 702 and RGB camera 706 in the example of FIG. 7) and the emitter 704. The processor 708 can be a general purpose microprocessor, or a specialized signal/image processor. The processor 708 is arranged to execute instructions to control the imaging sensor 700 and emitter 704 to capture depth images and/or RGB images. The processor 708 can also optionally be arranged to perform processing on these images, as outlined in more detail hereinafter.

In some examples the imaging sensor is used to provide silhouette images which are two dimensional binary images identifying foreground and background regions of the depth and/or RGB images captured by the imaging sensor. The silhouette images may be formed at the imaging sensor and/or processor 708 from the captured depth and RGB images. The silhouette images may be processed using the methods described herein to predict two dimensional joint positions. In this case the silhouette images can be thought of as depth images flattened to a fixed depth. The captured depth images may be used to predict three dimensional joint positions as described in more detail below.

The capture device 706 shown in FIG. 7 further includes a memory 710 arranged to store the instructions that for execution by the processor 708, images or frames of images captured by the depth camera 702 or RGB camera 706, or any other suitable information, images, or the like. In some examples, the memory 710 can include random access memory (RAM), read only memory (ROM), cache, Flash memory, a hard disk, or any other suitable storage component. The memory 710 can be a separate component in communication with the processor 708 or integrated into the processor 708.

The capture device 706 also comprises an output interface 712 in communication with the processor 708 and is arranged to provide data to the computing device via a communication link. The communication link can be, for example, a wired connection (such as USB, Firewire, Ethernet or similar) and/or a wireless connection (such as WiFi, Bluetooth or similar). In other examples, the output interface 712 can interface with one or more communication networks (such as the internet) and provide data to the computing device via these networks.

Figure 8:
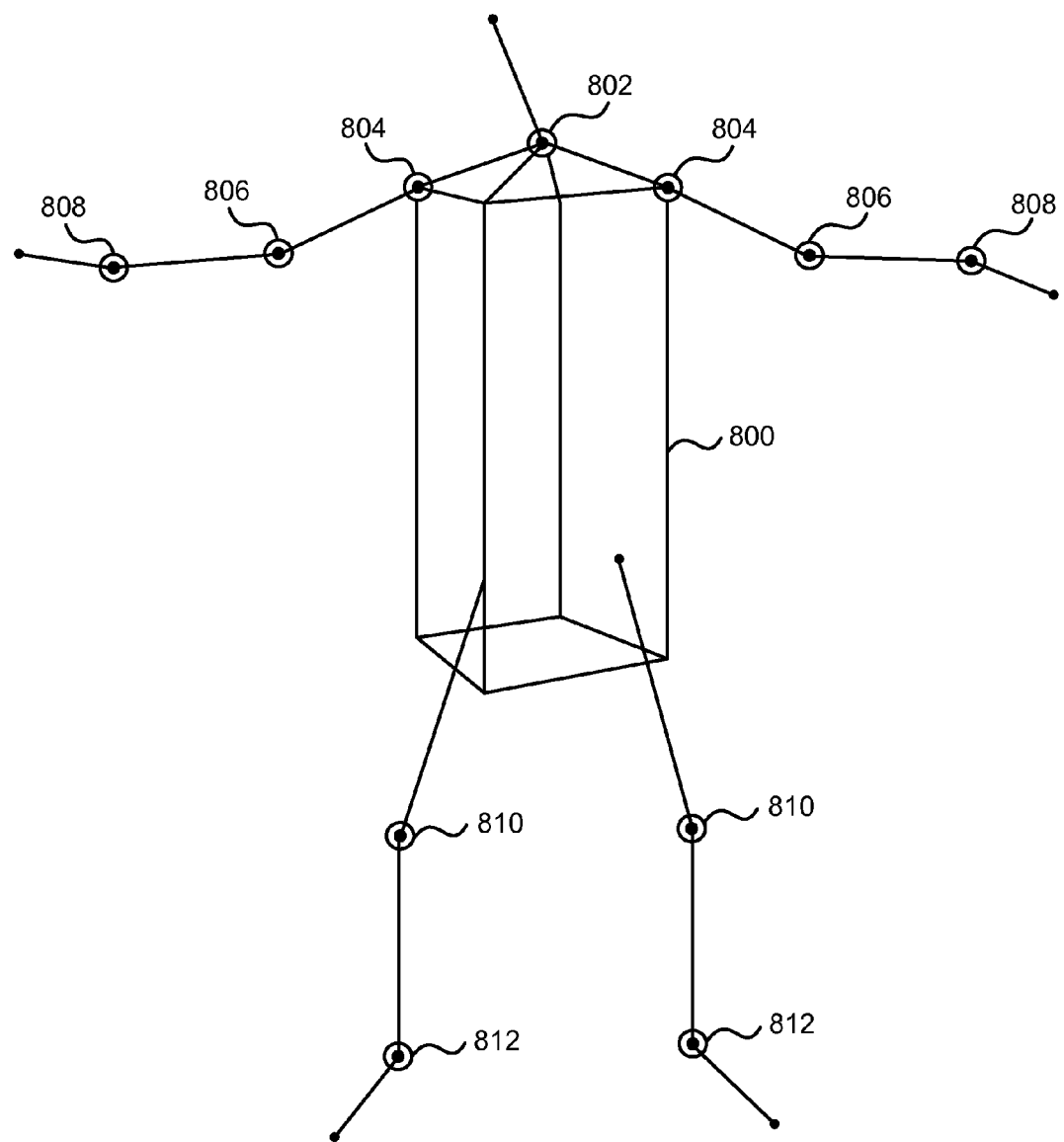
FIG. 8 is a schematic diagram of joint positions predicted in an image of a person.

To generate a 3-D model of the user, joint positions of the user may be predicted. FIG. 8 is a schematic diagram showing predicted joint positions of a user standing with his or her arms outstretched. In this example, predicted joint positions for the neck 802, shoulders 804, elbows 806, wrists 808, knees 810 and ankles 812 are shown. However, any number and combination of joint positions may be predicted according to the problem domain and the computing resources available.

Figure 9:
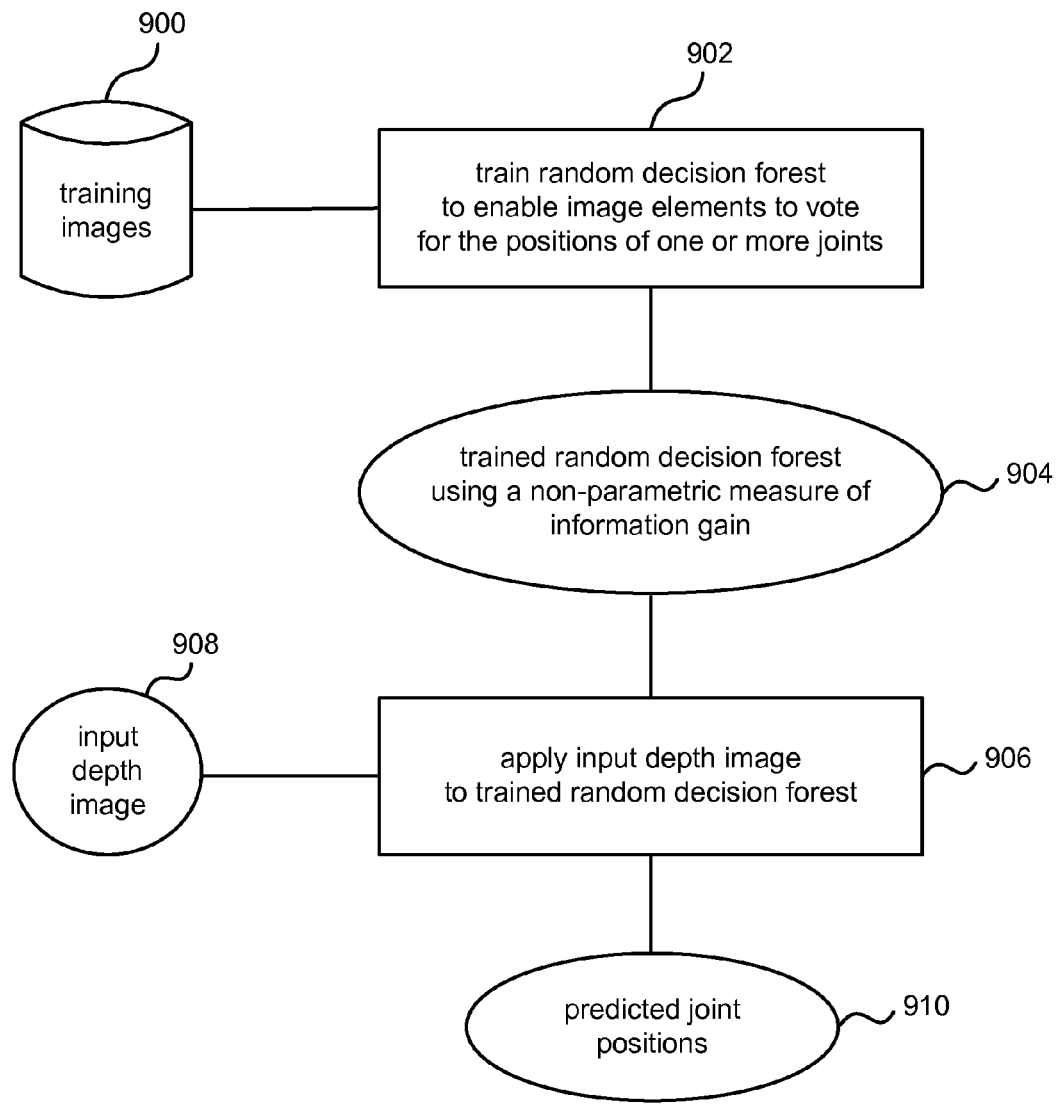
FIG. 9 is a flow diagram of a method of predicting joint positions in an input depth image using a trained decision forest.

FIG. 9 is a flow diagram of predicting joint positions in an input depth image 908 depicting one or more humans or animals or parts of humans or animals. A plurality of training images 900 which may be depth images that have specified joint positions is available. The images may be two dimensional, three dimensional or higher dimensional images or sequences of such images. The examples described herein use depth images but are also applicable to color images, medical images or other types of image.

A random decision forest is trained 902 to enable image elements of the training images 900 to vote for the positions of one or more joints depicted in those images. In the case of a regression task, such as detecting body joint positions, the random decision forest may be trained 904 using a non-parametric measure of information gain. This enables greater accuracy of prediction by the resulting trained random decision forest as described above.

Image elements may be pixels, groups of pixels, voxels, groups of voxels, blobs, patches or other components of an image. A random decision forest comprises one or more decision trees each having a root node, a plurality of split nodes and a plurality of leaf nodes. Image elements of an image may be pushed through trees of a random decision forest from the root to a leaf node in a process whereby a decision is made at each split node. The decision is made according to characteristics of the image element and characteristics of test image elements displaced therefrom by spatial offsets specified by the parameters at the split node. At a split node the image element proceeds to the next level of the tree down a branch chosen according to the results of the decision. The random decision forest may use regression or classification as described in more detail below. During training, parameter values (also referred to as features) are learnt for use at the split nodes and data is accumulated at the leaf nodes. For example, joint position votes are accumulated at the leaf nodes. A joint position vote is an image position (or region) where a joint is predicted to be relative to an image element making the vote. A joint position vote may be specified in any suitable manner. For example, as a vector expressing the relative distance and direction of a predicted joint position from an image element making the vote. It is not essential to use a vector, other formats may be used.

Storing all the joint position votes at the leaf nodes during training may be very memory intensive since large amounts of training data are typically used for practical applications. In some embodiments the votes are aggregated in order that they may be stored in a compact manner. Various different aggregation processes may be used as described in more detail below.

At test time a previously unseen depth image 908 is input to the system to have joint positions predicted. It is applied to the trained random decision forest 906 to obtain predicted joint positions 901. Each image element of the input depth image 908 may be sent through each tree of the trained random decision forest and joint position votes obtained from the leaves. In this way votes may be made by comparing each image element with test image elements displaced therefrom by learnt spatial offsets. Each image element may make a plurality of votes for each joint. These votes may be aggregated according to various different aggregation methods to give the predicted joint positions 910. The test time process is therefore a single stage process of applying the input depth image to the trained random decision forest to directly obtain predicted joint positions. The single stage process does not involve intermediate results such as body parts being predicted. This single stage process may be carried out in a fast and effective manner to give results in real-time and with high quality results.

Figure 10:
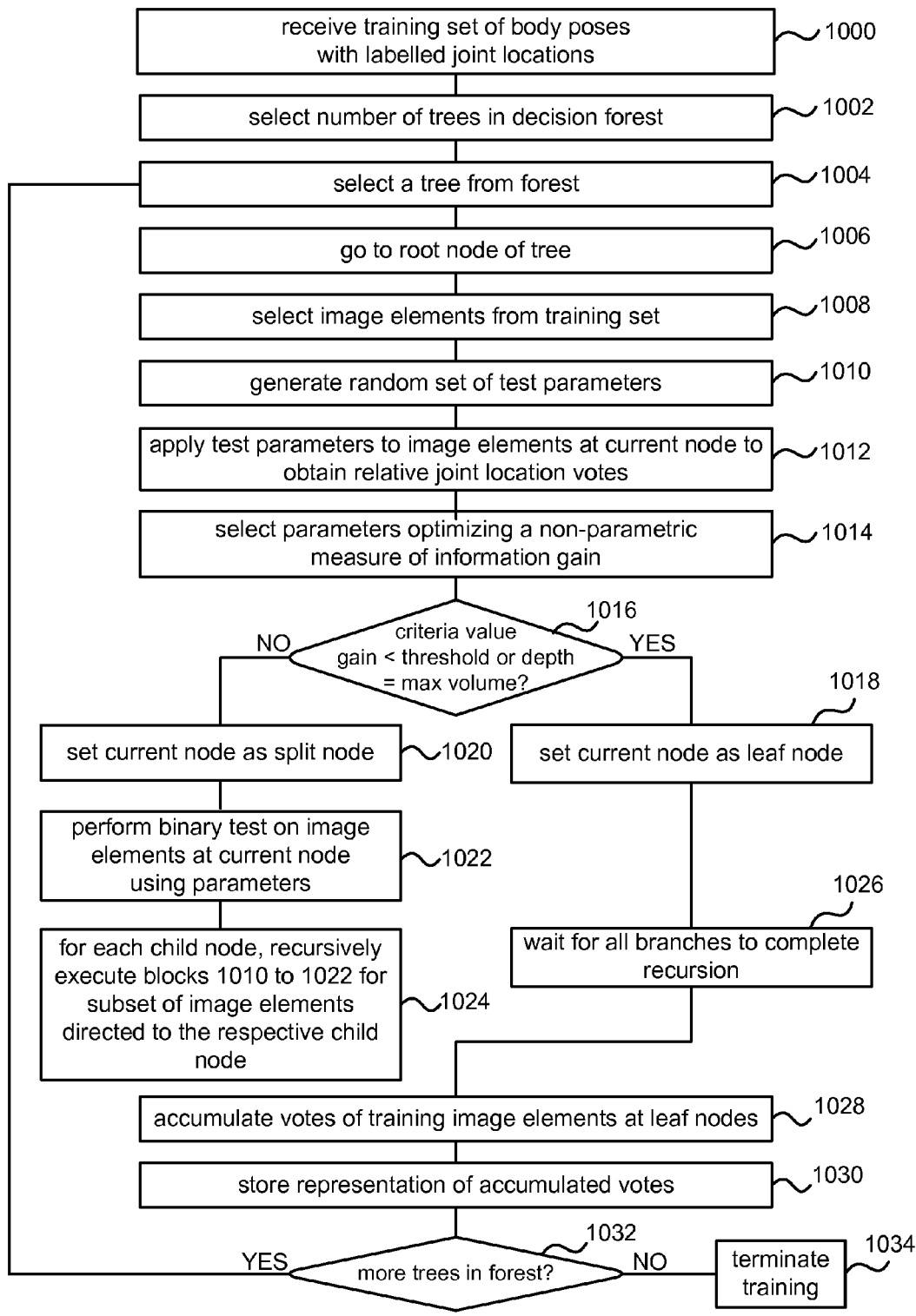
FIG. 10 is a flow diagram of a method of training a random decision forest.

FIG. 10 is a flowchart of a process for training a decision forest to identify joint positions in an image. This can also be thought of as generating joint position votes from image elements of an image. The decision forest is trained using a set of training images. The set of training images comprise a plurality images each showing at least one human or animal or part of a human or animal body. The bodies or body parts depicted in the training images are in various different poses (such as sitting or standing). Joint positions in the training images are specified. Therefore, the training set forms a ground-truth database.

In one example, rather than capturing depth images for many different examples of body poses, the training set can comprise synthetic computer generated images. Such synthetic images realistically model the human or animal body (or parts of the human or animal body) in different poses interacting with different objects, and can be generated to be viewed from any angle or position. They can be produced much more quickly than real depth images, and can provide a wider variety of training images.

Referring to FIG. 10, to train the decision trees, the training set described above is first received 1000. The number of decision trees to be used in a random decision forest is selected 1002. A random decision forest is a collection of deterministic decision trees. Decision trees can be used in classification or regression algorithms, but can suffer from over-fitting, i.e. poor generalization. However, an ensemble of many randomly trained decision trees (a random forest) yields improved generalization. During the training process, the number of trees is fixed.

In operation, each root and split node of each tree performs a binary test on the input data and based on the result directs the data to the left or right child node. The leaf nodes do not perform any action; they store accumulated joint position votes (and optionally other information). For example, probability distributions may be stored representing the accumulated joint position votes. In some examples the leaf nodes optionally store other information such as probability distributions over body parts. In this case the forest is able to act both as a regression forest to predict joint positions and as a classification forest to predict surface body parts.

The manner in which the parameters used by each of the split nodes are chosen and how the leaf node probabilities may be computed is now described. A decision tree from the decision forest is selected 1004 (e.g. the first decision tree 1000) and the root node 1006 is selected 1006. At least a subset of the image elements from each of the training images are then selected 1008. For example, the image may be segmented so that image elements in foreground regions are selected. Each selected image element x of each training image is associated with a plurality of known joint positions. For example, an image element at the torso may be associated with a known joint position for the left hip and a known joint position for the right hip. In another example, an image element at the torso may be associated with all known joint positions in the image.

A random set of test parameters are then generated 1010 for use by the binary test performed at the root node as candidate features.

A candidate function can only make use of image information which is available at test time. The parameter value for the function may be randomly generated during training. The process for generating the parameter may comprise generating random spatial offset values in the form of a two or three dimensional displacement. The result of the function is then computed by observing the depth value for a test image element which is displaced from the image element of interest x in the image by the spatial offset. The spatial offsets are optionally made depth invariant by scaling by 1/depth of the image element of interest. Threshold values may be used to decide whether the test image element is at a joint position.

This candidate function illustrates how the features in the images can be captured by considering the relative layout of visual patterns. For example, elbow joint image elements tend to occur a certain distance away, in a certain direction, from the shoulder joints and wrists of the body, and ankle joint image elements tend to occur a certain distance away, in a certain direction, from knee joint image elements.

The result of the binary test performed at a root node or split node determines which child node an image element is passed to. For example, if the result of the binary test is true, the image element is passed to a first child node, whereas if the result is false, the image element is passed to a second child node.

The random set of test parameters generated may comprise a plurality of random values for the function parameter and the threshold values. In order to inject randomness into the decision trees, the function parameters of each split node may be optimized over a randomly sampled subset of all possible parameters. This is an effective and simple way of injecting randomness into the trees, and increases generalization.

Then, every combination of test parameter may be applied 1012 to each image element in the set of training images. In other words, available values are tried one after the other for each image element in each training image. For each combination, criteria (also referred to as objectives) are calculated 1014. In an example, the calculated criteria comprise the differential entropy which may be calculated using a non-parametric estimator as described in more detail above where the task is a regression task.

It is then determined 1016 whether the value for the calculated criteria is less than (or greater than) a threshold. If the value for the calculated criteria is less than the threshold, then this indicates that further expansion of the tree does not provide significant benefit. This gives rise to asymmetrical trees which naturally stop growing when no further nodes are beneficial. In such cases, the current node is set 1018 as a leaf node. Similarly, the current depth of the tree is determined (i.e. how many levels of nodes are between the root node and the current node). If this is greater than a predefined maximum value, then the current node is set 1018 as a leaf node. Each leaf node has joint position votes which accumulate at that leaf node during the training process as described below.

It is also possible to use another stopping criterion in combination with those already mentioned. For example, to assess the number of example image elements that reach the leaf. If there are too few examples (compared with a threshold for example) then the process may be arranged to stop to avoid overfitting. However, it is not essential to use this stopping criterion.

If the value for the calculated criteria is greater than or equal to the threshold, and the tree depth is less than the maximum value, then the current node is set 1020 as a split node. As the current node is a split node, it has child nodes, and the process then moves to training these child nodes. Each child node is trained using a subset of the training image elements at the current node. The subset of image elements sent to a child node is determined using the parameters that optimized the criteria. These parameters are used in the binary test, and the binary test performed 1022 on all image elements at the current node. The image elements that pass the binary test form a first subset sent to a first child node, and the image elements that fail the binary test form a second subset sent to a second child node.

For each of the child nodes, the process as outlined in blocks 1010 to 1022 of FIG. 10 are recursively executed 1024 for the subset of image elements directed to the respective child node. In other words, for each child node, new random test parameters are generated 1010, applied 1012 to the respective subset of image elements, parameters optimizing the criteria selected 1014, and the type of node (split or leaf) determined 1016. If it is a leaf node, then the current branch of recursion ceases. If it is a split node, binary tests are performed 1022 to determine further subsets of image elements and another branch of recursion starts. Therefore, this process recursively moves through the tree, training each node until leaf nodes are reached at each branch. As leaf nodes are reached, the process waits 1026 until the nodes in all branches have been trained. Note that, in other examples, the same functionality can be attained using alternative techniques to recursion.

Once all the nodes in the tree have been trained to determine the parameters for the binary test optimizing the criteria at each split node, and leaf nodes have been selected to terminate each branch, then votes may be accumulated 1028 at the leaf nodes of the tree. This is the training stage and so particular image elements which reach a given leaf node have specified relative joint position votes known from the ground truth training data. A representation of the accumulated votes may be stored 1030 using various different methods. Optionally sampling may be used to select votes to be accumulated and stored in order to maintain a low memory footprint. For example, reservoir sampling may be used whereby a fixed maximum sized sample of votes is taken. Selection may be random or in any other manner.

Once the accumulated votes have been stored it is determined 1032 whether more trees are present in the decision forest. If so, then the next tree in the decision forest is selected, and the process repeats. If all the trees in the forest have been trained, and no others remain, then the training process is complete and the process terminates 1034.

Therefore, as a result of the training process, one or more decision trees are trained using synthesized or empirical training images. Each tree comprises a plurality of split nodes storing optimized test parameters, and leaf nodes storing associated joint position votes or representations of aggregated joint position votes. Due to the random generation of parameters from a limited subset used at each node, the trees of the forest are distinct (i.e. different) from each other.

The training process may be performed in advance of using the trained prediction system to identify joint positions in a real depth image. The decision forest and the optimized test parameters may be stored on a storage device for use in identifying joint positions in depth images at a later time.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Although the training data described in the methods herein comprises labeled training data it is also possible to use unlabeled training data. In that case the uncertainty measure takes into account the fact that the training data may be unlabeled (in entirety or partially) and the uncertainty measure may also be bias corrected or non-parametric as described above.

Figure 11:
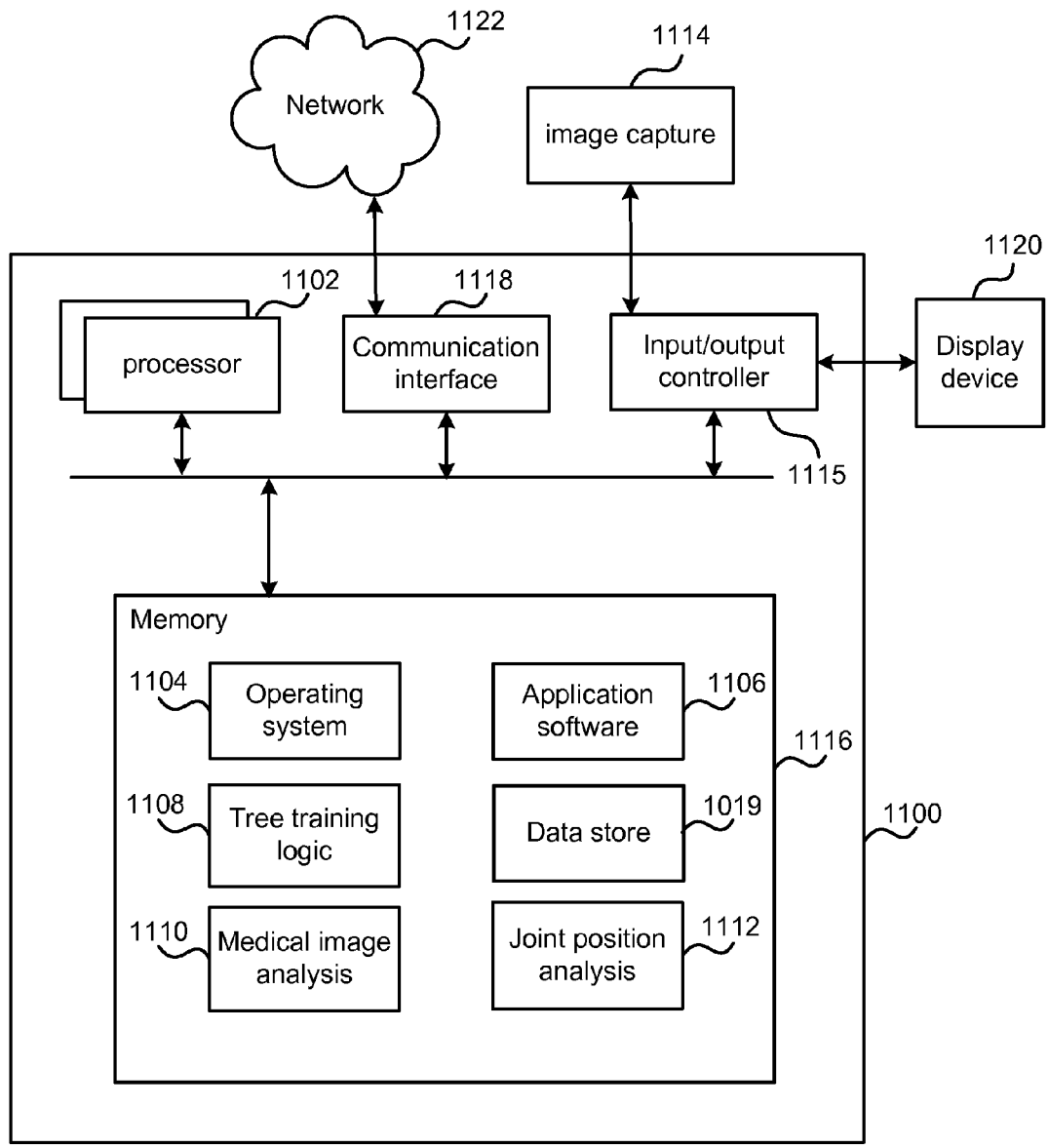
FIG. 11 illustrates an exemplary computing-based device in which embodiments of a system for training and/or using a trained random decision forest may be implemented.

FIG. 11 illustrates various components of an exemplary computing-based device 1100 which may be implemented as any form of a computing and/or electronic device, and in which embodiments of a machine learning system may be implemented.

Computing-based device 1100 comprises one or more processors 1102 which may be microprocessors, controllers or any other suitable type of processors for processing computer executable instructions to control the operation of the device in order to train a random decision forest using improved uncertainty estimates. In some examples, for example where a system on a chip architecture is used, the processors 1102 may include one or more fixed function blocks (also referred to as accelerators) which implement a part of the method of training a random decision forest or calculating an uncertainty estimate in hardware (rather than software or firmware). Platform software comprising an operating system 1104 or any other suitable platform software may be provided at the computing-based device to enable application software 1106 to be executed on the device. The computing device 1100 may comprise a tree training logic 1108 arranged to train a random decision tree using any of the methods described herein. The computing device 1100 may comprise a medical image analysis component 1110 in the case that the computing device provides a medical image analysis system as described herein with reference to FIGS. 1 to 5. The computing device 1100 may comprise a joint position analysis component in the case that the computing device provides a body joint position detection system as described herein with reference to FIGS. 6 to 10. A data store 1019 may store images, parameter values, trained random decision trees and other data.

The computer executable instructions may be provided using any computer-readable media that is accessible by computing based device 1100. Computer-readable media may include, for example, computer storage media such as memory 1116 and communications media. Computer storage media, such as memory 1116, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1116) is shown within the computing-based device 1100 it will be appreciated that the storage may be distributed or located remotely and accessed via a network or other communication link (e.g. using communication interface 1118).

The computing-based device 1100 also comprises an input/output controller 1115 arranged to output display information to a display device 1100 which may be separate from or integral to the computing-based device 1100. The display information may provide a graphical user interface. The input/output controller 1115 is also arranged to receive and process input from one or more devices, such as a user input device (e.g. a mouse, keyboard, camera, microphone or other sensor). In some examples the user input device may detect voice input, user gestures or other user actions and may provide a natural user interface (NUI). This user input may be used to set parameter values, control input of training data, control how output of random decision forests is used and for other purposes. In an embodiment the display device 1120 may also act as the user input device if it is a touch sensitive display device. The input/output controller 1115 may also output data to devices other than the display device, e.g. a locally connected printing device.

The input/output controller 1115, display device 1120 and optionally the user input device may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A machine learning device comprising:
    a communications interface arranged to receive training data;
    a tree training logic arranged to train a random decision forest using the received training data and on a basis of uncertainty measures taken at a plurality of split nodes of at least some of the received training data computed using an uncertainty measurement logic;
    the tree training logic further arranged to train the random decision forest at least on a basis of a bias-corrected Gini index; and
    the uncertainty measurement logic arranged to calculate a measure of uncertainty which is bias corrected in case of classification tasks or which uses a non-parametric estimate of the uncertainty in case of regression.

2. A machine learning device as claimed in claim 1, the uncertainty measurement logic arranged to correct for bias introduced by estimation, using a limited amount of training data, of a probability distribution from which the training data is generated.

3. A machine learning device as claimed in claim 1, the uncertainty measurement logic arranged to compute a bias corrected estimate of the Gini index by using a resampling method that estimates a mean of a probability distribution of an estimated Gini index of a sample from the training data.

4. A machine learning device as claimed in claim 1, the uncertainty measurement logic arranged to compute a bias corrected estimate of an entropy.

5. A machine learning device as claimed in claim 1 the uncertainty measurement logic arranged to compute a bias corrected estimate of an entropy using a Grassberger estimate.

6. A machine learning device as claimed in claim 1, the uncertainty measurement logic using the non-parametric estimate of uncertainty which is an estimate of a probability distribution of the training data made without assuming that the probability distribution comes from a specified family of parametric distributions, and where the non-parametric estimate of uncertainty uses a one-nearest neighbor estimator.

7. A machine learning device as claimed in claim 1, the uncertainty measurement logic using the non-parametric estimate of uncertainty which is an estimate of a probability distribution of the training data made without assuming that the probability distribution comes from a specified family of parametric distributions, and where the non-parametric estimate of uncertainty uses a one-nearest neighbor estimator computed using k-d trees.

8. A machine learning device as claimed in claim 1, the uncertainty measurement logic using the non-parametric estimate of uncertainty which is an estimate of a probability distribution of the training data made without assuming that the probability distribution comes from a specified family of parametric distributions, and where the non-parametric estimate of uncertainty uses any of: a kernel density estimate, a length of minimum spanning trees, a k-nearest neighbor distance.

9. A machine learning device as claimed in claim 1 the uncertainty measurement logic being at least partially implemented using hardware logic selected from any one or more of: a field-programmable gate array, a program-specific integrated circuit, a program-specific standard product, a system-on-a-chip, a complex programmable logic device, and a graphics processing unit.

10. A machine learning method comprising:
    receiving training data at a communications interface;
    training, at a processor, a random decision forest using the received training data and on a basis of a measure of uncertainty taken at at least one split node of at least some of the received training data, the measure of uncertainty calculated based at least in part on bootstrap resampling;
    further training the random decision forest at least on a basis of a bias-corrected Gini index; and computing, at the processor, the measure of the uncertainty so as to either correct for bias in the measurement of the uncertainty or to use a non-parametric estimate of the uncertainty.

11. A method as claimed in claim 10 comprising computing the measure of the uncertainty so as to correct for bias introduced by estimation, using a limited amount of training data, of a probability distribution from which the training data is generated.

12. A method as claimed in claim 10 comprising computing a bias corrected estimate of an entropy.

13. A method as claimed in claim 10 at least partially carried out using hardware logic.

14. A method as claimed in claim 10, wherein a bias corrected estimate of the Gini index is computed by using a resampling method that estimates a mean of a probability distribution of an estimated Gini index of a sample from the training data.

15. A method as claimed in claim 10, wherein the measure of the uncertainty is computed using hardware logic selected from any one or more of: a field-programmable gate array, a program-specific integrated circuit, a program-specific standard product, a system-on-a-chip, a complex programmable logic device, and a graphics processing unit.

16. A method as claimed in claim 10, wherein the non-parametric estimate of uncertainty is used which is an estimate of a probability distribution of the training data made without assuming that the probability distribution comes from a specified family of parametric distributions, and where the non-parametric estimate of uncertainty uses a one-nearest neighbor estimator.

17. A machine learning method comprising:

receiving training data at a communications interface the training data comprising examples of data to be classified into one of a plurality of possible classes;

training, at a processor, a random decision forest to classify data into the possible classes, the training carried out using the received training data and on the basis of a measure of uncertainty taken at at least one split node of at least some of the received training data;

computing, at the processor, the measure of the uncertainty so as to use a non-parametric estimate of the uncertainty, the non-parametric measure of the uncertainty based at least in part on a one-nearest neighbor estimator of differential entropy, calculation of the entropy comprising a sum over the training data of a logarithm of Euclidean distance, and bias-correcting the measure of uncertainty and where a number of possible classes is such that it is difficult to estimate empirical class frequencies reliably.

18. A method as claimed in claim 17 comprising computing the measure of the uncertainty so as to correct for bias introduced by estimation, using a limited amount of training data, of a probability distribution from which the training data is generated.

19. A method as claimed in claim 17 where the number of possible classes is at least ten.

20. A method as claimed in claim 17 at least partially carried out using hardware logic.

\* \* \* \* \*